United States Patent [19]

Dillon

[11] 4,397,448
[45] Aug. 9, 1983

[54] FENCE POST-TOP RAIL CONNECTOR

[75] Inventor: Michael J. Dillon, North Township, Lake County, Ind.

[73] Assignee: U.S. Steel Corporation, Pittsburgh, Pa.

[21] Appl. No.: 365,075

[22] Filed: Apr. 5, 1982

[51] Int. Cl.$^3$ ............................................. E04H 17/14
[52] U.S. Cl. ...................................... 256/65; 403/233; 403/191
[58] Field of Search ........................ 403/233, 235, 191; 256/68, 65

[56] References Cited

U.S. PATENT DOCUMENTS

| 1,832,584 | 11/1931 | Rogers, Jr. | 403/191 |
| 3,021,159 | 2/1962 | Back | 403/191 |
| 3,972,639 | 8/1976 | Lening | 403/191 |
| 4,039,166 | 8/1977 | Elgin | 256/65 |

FOREIGN PATENT DOCUMENTS 2018648  8/1971  Fed. Rep. of Germany ...... 403/233

Primary Examiner—Andrew V. Kundrat
Attorney, Agent, or Firm—George D. Dickos

[57] ABSTRACT

A connector for affixing the top rail of a wire fabric fence to the fence posts thereof is described. The connector consists of a resilient metallic strip fabricated into a loop portion from which depend leg portions which extend inward, substantially parallel, then outward. When inserted into a fence post the connector legs enter into yielding frictional engagement with the inner walls thereof, said engagement being enhanced by the engagement of said parallel portions with one another thereby increasing the resiliency of the connector.

9 Claims, 4 Drawing Figures

FENCE POST-TOP RAIL CONNECTOR

BACKGROUND OF THE INVENTION

The present invention relates to a connector for attaching a first longitudinal member to a transverse longitudinal member. More particularly, the invention relates to a one-piece connector which fits into the fence post of a wire fabric fence for affixing a top rail thereto.

In conventional wire fabric fence construction a series of vertical fence posts are set in the ground along the route of the fence. The upper ends of the fence posts are then joined by means of top rails which span the regions between the posts and are secured to the upper ends thereof. These rails are typically secured to the fence posts by a connecting means which typically comprises a fence post cap. Finally, the wire fabric is applied to the framework thus formed to complete the fence.

While various means for connecting the top rail of a fence to a fence post are known, the conventional means of attachment is through the use of a fence post cap. Customarily, fence post caps consist of a cap member which rests on the top of a fence post to which is affixed a loop member for retaining the rail. While some conventional fence post caps are molded or forged in one piece, other caps are fabricated from metal parts which are welded or otherwise joined. An example of the latter type of fence post cap appears in U.S. Pat. No. 3,972,639 issued to Lening. Alternatively, the fence post cap may be stamped from a pre-cut sheet metal blank as in U.S. Pat. No. 4,039,166 issued to Elgin.

While the existing rail caps are satisfactory to some degree, certain deficiencies are present therein which are overcome by the present invention. A primary difficulty with conventional fence post caps is that typically they are costly to manufacture. This costliness is due to the extensive fabrication necessitated by the conventional designs thereof and the considerable amount of material required for their manufacture. In addition, many rail caps found in the prior art suffer from structural weakness which often result in damage to the caps. Such damage is particularly prevalent during installation of the caps due to the excessive torques and other loads inadvertently applied to the caps through the long lever arm of the rail during its insertion through the caps.

The subject invention is directed to an improved connector to affix the top rail of a wire fabric fence to the fence posts thereof which overcomes, among others, the above discussed problems by providing a connector of a simplified, one-piece design that provides the requisite strength for typical installations.

SUMMARY OF THE INVENTION

In accordance with the present invention, there is provided a connector for affixing the top rails of a wire fabric fence to the hollow fence posts thereof. The connector comprises a resilient, elongated metallic strip formed into the configuration provided herein. The connector includes a loop portion from which depend leg portions which extend inclinedly inward, substantially parallel, and inclinedly outward. When inserted into the top of a fence post the parallel portions are caused to engage one another thus increasing the resiliency of the connector and hence the frictional engagement thereof with the fence post.

Accordingly, the present invention provides solutions to the aforementioned problems present in conventional fence post caps. As a simplified, one-piece design is provided, the manufacturing costs are drastically reduced while maintaining the requisite strength and flexibility.

These and other details, objects, and advantages of the invention will become apparent as the following description of the present preferred embodiment thereof proceeds.

BRIEF DESCRIPTION OF THE DRAWINGS

In the accompanying drawings, there is shown a present preferred embodiment of the invention wherein.

DETAILED DESCRIPTION OF THE INVENTION

Figure 1:
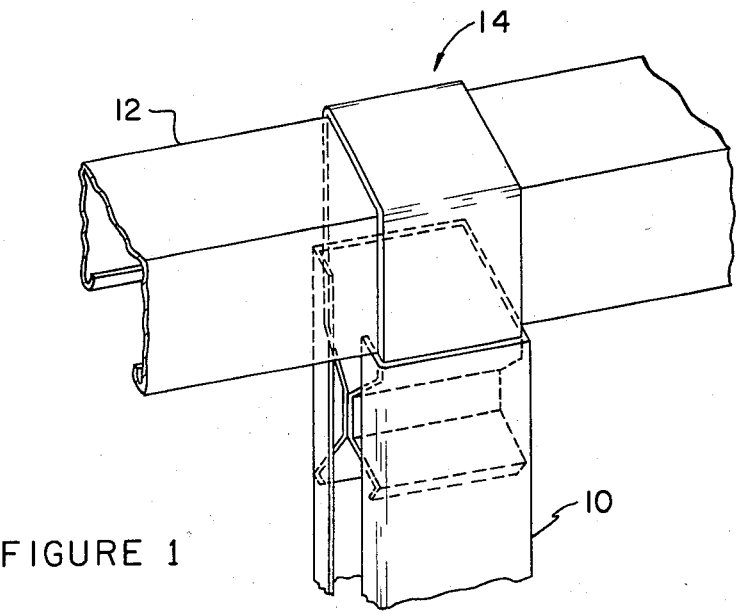
FIG. 1 is a perspective view of the top rail, fence post and connector assembly herein provided.
Figure 2:
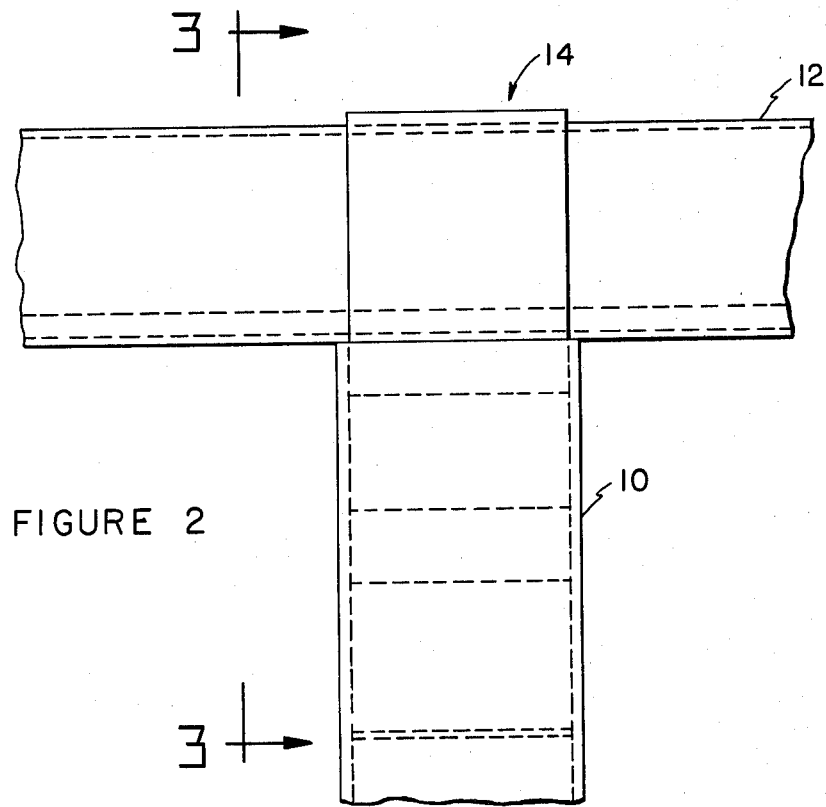
FIG. 2 is a front elevational view of the top rail, fence post and connector assembly herein provided.
Figure 3:
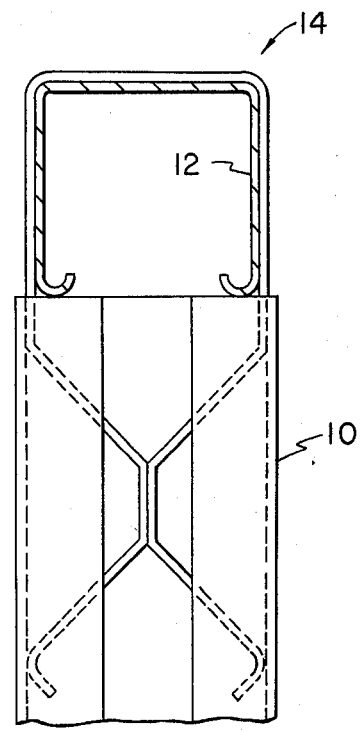
FIG. 3 is a side elevational view of the present connector inserted into a hollow fence post and restraining a top rail; and, FIG. 4 is a side elevational view of the present connector in an uninstalled condition.

Referring to the drawings wherein the showings are for purposes of illustrating the present preferred embodiment of the invention only and not for purposes of limiting same, the figures show a fence post 10 and a fence top rail 12 affixed by means of a connector 14.

More particularly and with reference to FIG. 1, there is shown the herein disclosed connector 14 installed in a "C"-section fence post 10, although it is to be understood that the present invention is applicable to any hollow fence post. Affixed to fence post 10 by means of the connector 14 is top rail 12. As such, the basic framework for a wire-fabric fence is depicted.

Figure 4:
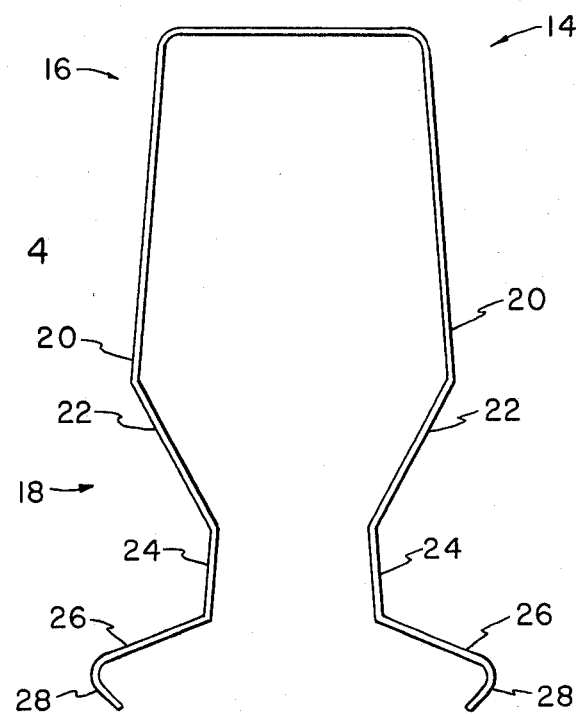

The connector 14 itself consists of a resilient material fabricated into the form herein disclosed. The material used in the fabrication of connector 14 may consist of any resilient material, but for purposes of illustration will be herein described as a resilient metal. To form the metal connector 14 a resilient metal strip, e.g. strapping stock, is bent into the uninstalled shape depicted in FIG. 4. As such, the connector 14 includes a loop portion 16 at the top thereof which is effective to retain a rail 12. Extending from loop 16 are legs, generally designated as 18 which yieldingly frictionally engage fence post 10. Legs 18 initially extend to include first parallel portions 20 of loop 16 which provide surfaces for frictional engagement with fence post 10. Proceeding along legs 18 away from loop 16 are first inclined portions 22 which extend inclinedly inward toward the axis of connector 14. Extending from inclined portions 22 are substantially parallel portions 24 of the legs 18. First inclined portions 22 are configured so as to cause parallel portions 24 to engage one another upon insertion of the legs 18 into fence post 10 thereby increasing the resiliency of connector 14. From parallel portions 24 extend second inclined portions 26 which extend inclinedly outward from the axis of connector 14. Legs 18 terminate in bend portions 28 which extend from inclined portions 26 and are configured to frictionally engage fence post 10 upon insertion therein.

In the construction of a wire fabric fence structure, rail 12 is first inserted into loop 16. Legs 18 are then urged toward one another and are inserted into fence post 10. To complete the installation, the connector 14 is urged downward into fence post 10 into a frictional locking engagement therewith. The frictional engagement requisite occurs primarily due to the engagement of parallel portions 24 with one another. With these portions 24 so engaged the bend portions 28 and the parallel portions 20 are urged outward into additional frictional contact with fence post 10.

It will be understood that various changes in the details, materials, and arrangements of parts which have been herein described and illustrated in order to explain the nature of the invention may be made by those skilled in the art within the principle and scope of the invention as expressed in the appended claims.

What is claimed is:

1. A resilient connector for attaching a hollow first longitudinal member to a transverse longitudinal member, said connector comprising:
   (a) a loop portion for receiving said transverse longitudinal member; and,
   (b) leg portions extending from said loop portion for insertion into one end of said first longitudinal member and into yielding frictional engagement with the inner walls thereof, each of said legs further comprising
      (i) a first inclined portion in which said legs extend inclinedly inward toward the axis of said connector; and,
      (ii) a substantially parallel portion, said parallel portions of each leg being configured to engage one another when said legs are inserted into said first longitudinal member whereby the mutual engagement of said parallel portions enhances the resiliency of said legs and the frictional engagement thereof with the inner walls of said first longitudinal member.

2. The connector of claim 1 in which each leg further comprises a second inclined portion extending inclinedly outward from said substantially parallel portion, the end of each said second inclined portion being effective to frictionally engage the inner walls of said first longitudinal member when inserted therein.

3. The connector of claim 2 in which said connector is formed from flat, elongated resilient metal strip.

4. A resilient connector for attaching a rail to the top of a hollow, substantially rectangular section fence post, said connector comprising:
   (a) a loop portion for receiving said rail; and,
   (b) leg portions extending from said loop portion for insertion into the top of said fence post and into yielding frictional engagement with the inner walls thereof, each of said legs further comprising
      (i) a first inclined portion in which said legs extend inclinedly inward toward the axis of said connector; and,
      (ii) a substantially parallel portion, said parallel portions of each leg being configured to engage one another when said legs are inserted into said fence post whereby the mutual engagement of said parallel portions enhances the resiliency of said legs and the frictional engagement thereof with the inner walls of said fence post.

5. The connector of claim 4 in which each leg further comprises a second inclined portion extending inclinedly outward from said substantially parallel portion, the end of each said second inclined portion being effective to frictionally engage the inner walls of said fence post when inserted therein.

6. The connector of claim 5 in which said connector is formed from flat, elongated, resilient metal strip.

7. A fence support system, comprising:
   (a) a hollow, substantially rectangular section fence post;
   (b) a rail; and,
   (c) a connector means for attaching said rail to said fence post, said connector comprising
      (i) a loop portion for receiving said rail; and,
      (ii) leg portions extending from said loop portion for insertion into the top of said rail and into yielding frictional engagement with the inner walls thereof, each of said legs further comprising
         (aa) first inclined portion in which said legs extend inclinedly inward toward the axis of said connector; and,
         (bb) a substantially parallel portion, said parallel portions of said legs being configured to engage one another whereby the mutual engagement of said parallel portions enhances the resiliency of said legs and the frictional engagement thereof with the inner walls of said fence post.

8. The fence support system of claim 7 in which each leg further comprises a second inclined portion extending inclinedly outward from said substantially parallel portion, the end of each said second inclined portion being effective to frictionally engage the inner walls of said fence post when inserted therein.

9. The fence support system of claim 8 in which said connector is formed from flat, elongated, resilient metal strip.

* * * * *